United States Patent [19]

Manfré et al.

[11] 4,310,352

[45] Jan. 12, 1982

[54] PROCESS FOR THE PREPARATION OF A MIXTURE COMPRISING A SOLID PHASE AND A LIQUID PHASE OF A METAL ALLOY, AND DEVICE FOR ITS PERFORMANCE

[75] Inventors: Giovanni Manfré, Vinovo, Italy; Jonathan Mironi, Haifa, Israel; Renzo Moschini, Senigallia, Italy

[73] Assignee: Centro Ricerche Fiat S.p.A., Turin, Italy

[21] Appl. No.: 160,023

[22] Filed: Jun. 16, 1980

[30] Foreign Application Priority Data

Jun. 20, 1979 [IT] Italy ............................... 68310 A/79

[51] Int. Cl.³ ............................................... C22B 9/00
[52] U.S. Cl. ..................................... 75/93 R; 75/65 R; 75/129; 75/130 DR
[58] Field of Search ............... 75/93 R, 60, 129, 65 R, 75/130 R

[56] References Cited

U.S. PATENT DOCUMENTS

| | | | |
|---|---|---|---|
| 3,528,799 | 9/1970 | Ramacciotti | 75/60 |
| 3,840,364 | 10/1974 | Flemings | 75/65 R |
| 3,936,298 | 2/1976 | Mehrabian | 75/129 |
| 3,948,650 | 4/1976 | Flemings | 75/65 R |
| 3,951,651 | 4/1976 | Mehrabian | 75/65 R |

Primary Examiner—P. D. Rosenberg
Attorney, Agent, or Firm—Frost & Jacobs

[57] ABSTRACT

A process for the preparation of a mixture comprising a solid phase and a liquid phase of a metal alloy, in which the concentration of the said solid phase has a pre-established value, is described; it comprises at least a first stage for bringing the said alloy into a completely fluid state, a second stage for creating a constant range flow of the mixture between an inlet section and an outlet section, a third stage for subdividing in a longitudinal direction the said flow into a plurality of flow sections, each of which has a predetermined length and in each of which the flow is subdivided into at least two independent streams, and a fourth stage for making each of the said streams flow along such a trajectory as to obtain in each of the said streams of each flow section a confluence of parts of both streams of the immediately preceding section.

10 Claims, 4 Drawing Figures

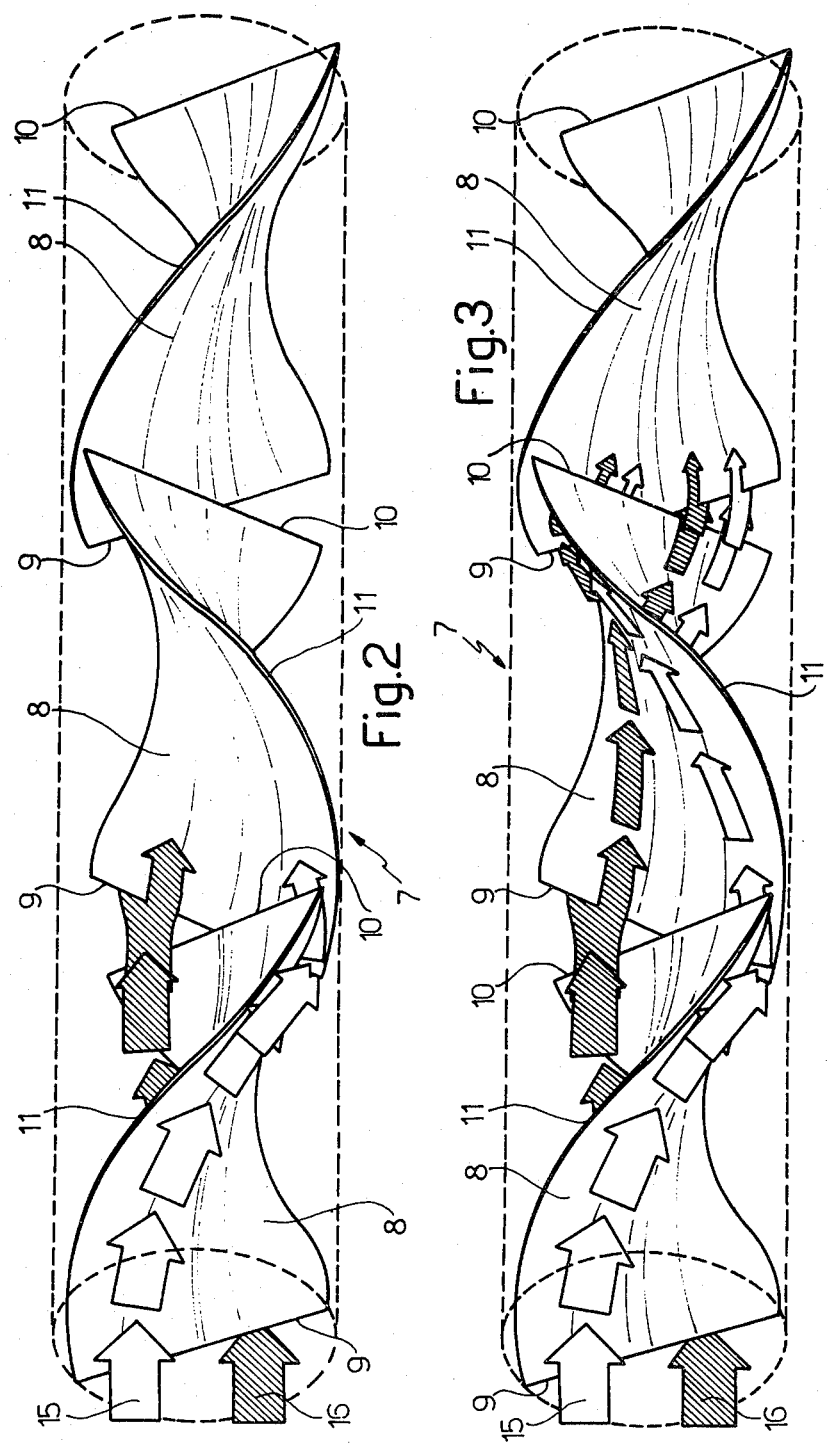

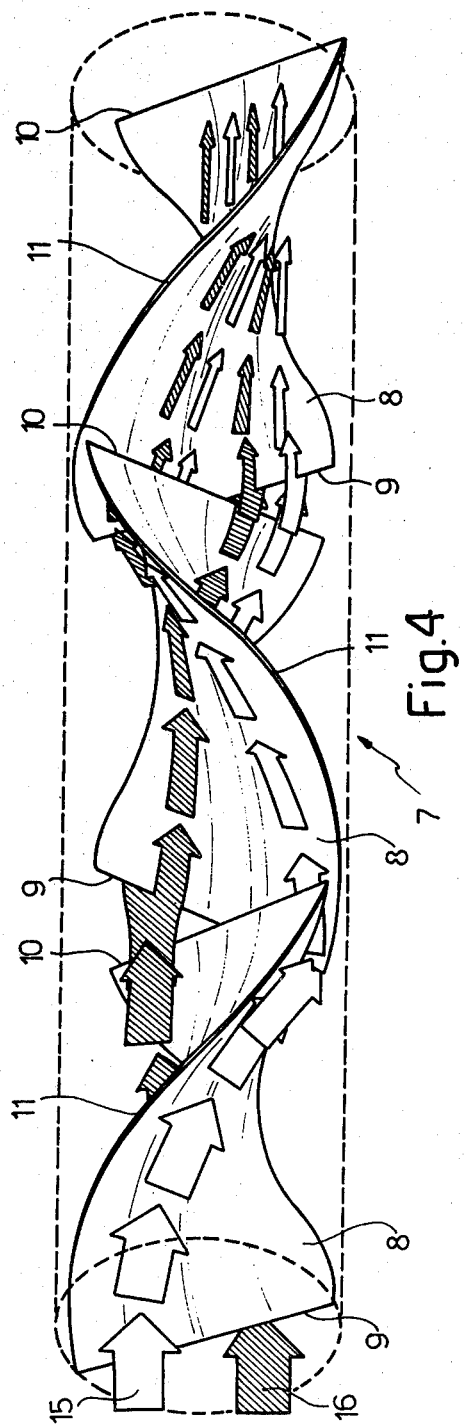

PROCESS FOR THE PREPARATION OF A MIXTURE COMPRISING A SOLID PHASE AND A LIQUID PHASE OF A METAL ALLOY, AND DEVICE FOR ITS PERFORMANCE

BACKGROUND OF THE INVENTION

The present invention relates to a process and device for the preparation of mixture comprising a solid phase and a liquid phase of a metal alloy, of the type of those which are utilized in the so-called "semiliquid molding processes".

It is known in metallurgy that the metal alloys have a thermal solidification range whose amplitude is characteristic of the alloy itself. Above the upper limit ("liquidus" point) of such range, the alloy is completely in the liquid state, whilst below the lower limit ("solidus" point) the alloy is in the solid state. In the solidification range two phases are present, a liquid phase and a solid phase, the respective quantity of which is a function of the temperature and the composition of the alloy.

In the conventional solidification conditions, the solid appears in a dendritic form; i.e. in the form of an arborescent skeleton, characterized by main branches, from which secundary, tertiary etc. branches extend perpendicularly.

Already at a solid fraction of 20% the dendrites which are present form a continuous arborescent skeleton which increases the viscosity values beyond the limits acceptable for a casting operation.

There are known processes by means of which it is possible to prepare a mixture containing a solid phase and a liquid phase of a metal material, which mixture, though having a rather high concentration of the solid phase, has the characteristic properties of the liquids, in particular a relatively low viscosity.

Some processes are directed to substantially provide a creep between the various particles of the mixture maintained in movement, so as to break, within certain limits, the dendritic interconnections which are formed during the solidification of the mixture, and to prevent the further growth of the dendrites; in this way, the dendritic fragments remain independent and tend to assume spheroidal shapes under the action of the continuous mechanical impacts.

The said creep, which is evaluated by means of the respective gradient, can be obtained in the interior both of a turbulent flow and a stationary fluid stream, i.e. a stream in which the various particles of the mixture move at predetermined speed depending on the position they have relative to the walls of the cavities they traverse.

A process is known, which consists in making an alloy traverse, in the melted condition, an axial channel annular in shape, which is obtained by means of a tubular container which is suitably cooled and in the interior of which a cylindrical entraining rotor rotates coaxially with the axis of the container itself; the particles of the forming mixture which are immediately adjacent the surface of the said rotor are made to rotate substantially at the same tangential speed as the surface of the rotor, whilst the particles situated at a greater distance from the said axis are entrained at a lower tangential speed which becomes substantially equal to zero for the particles which are in contact with the inner surface of the said container.

Therefore, a predetermined range of movement is established, in which occurs a gradual variation of the speed of the particles in the radial direction of the annular channel which is traversed by the mixture, with the result that a predetermined creep gradient between the particles is created; in this way, the dendritic bonds which tend to form in the mixture, as the mixture cools, break, thereby allowing to maintain the mixture relatively fluid, but still having a sufficiently high contents of a solid phase.

This process has some disadvantages. First of all, the time required for the treatment of a predetermined quantity of mixture is rather long; moreover, for a pre-established viscosity of the mixture obtained by means of the said process, the percentage of solid phase contained in it is not very high. These disadvantages are originated particularly by the fact the the creep gradient between the various flow lines of the mixture maintained in movement in the way described hereinabove is rather modest, with the result that the obtained action of breaking the dendritic bonds is not very efficient. In fact, in an annular channel, as is the channel which in the process described hereinabove is traversed by the mixture, it is not possible to obtain high creep gradients without giving rise to serious disadvantages; the increase of the gradient may be obtained only by reducing the radial dimension of the said channel (with the consequent reduction of the range of the flow) or by increasing the speed of the entrainment rotor (with the consequent increase of the power of the installation and the vibrations).

Furthermore, in the process described hereinabove, it is not possible to obtain a mixture having a high percentage of solid particles of small dimensions, because the thermal exchanges between the particles of the mixture are very low; in fact, the movements between the various lines of flow of the mixture (which depend only on the entraining action of the rotor) are rather modest, so that only small thermal exchanges between the particles are obtained.

Moreover, the process described hereinabove is not suitable for feeding in a continuous manner the mixture to an integral forming plant (for example a molding plant, a pressure die-casting plant), because some stages of the process cannot be carried out without interruption.

Finally, the performance of the process described hereinabove requires the use of a device whose structure is not simple and whose overall dimensions are rather large, owing both to the presence of the entraining member mentioned hereinabove and, above all, the relative rotation which has to be obtained between this latter and the container in which it is located; in fact, support means are necessary for the said element, as well as a suitable source of movement and suitable transmission means.

SUMMARY OF THE INVENTION

An object of the present invention is to provide a process for the preparation of a mixture comprising a solid phase and a liquid phase of a metal alloy, which will allow avoiding the disadvantages mentioned hereinabove.

The process according to the present invention is characterized in that it comprises at least a first stage for bringing the said alloy into a completely fluid state, a second stage for creating a constant range flow of the said mixture between an inlet section and an outlet section, a third stage for subdividing in a longitudinal direction the said flow into a plurality of flow sections, each of which has a predetermined length and in each of which the flow is subdivided into
at least two streams indipendent from one another, and a fourth stage for making each of the said streams flow along such a trajectory as to obtain in each of the said streams of each flow section a confluence of parts of both streams of the immediately preceding section, the said mixture being cooled while it moves along the said flow so that the material of the said mixture will be subjected to a different creep gradient during the passage from one to the other of the said sections, in order to produce the break and prevent the growth of the dendritic bonds which tend to form in the said solid phase, and will be subjected, between the inlet and outlet sections, to a high thermal gradient.

Another object of the present invention is to provide a device arranged to carry out the said process.

BRIEF DESCRIPTION OF THE DRAWINGS

For a better understanding of the process and device of the present invention, the fundamental stages of the process will now be considered with reference to a particular embodiment of the device shown by way of non limiting example in the annexed drawings, in which:

FIGS. 2, 3 and 4 show diagrammatically longitudinal sectional views of the separation and conveyance means forming part of the device, in three successive operative positions.

DETAILED DESCRIPTION OF THE INVENTION

Figure 1:
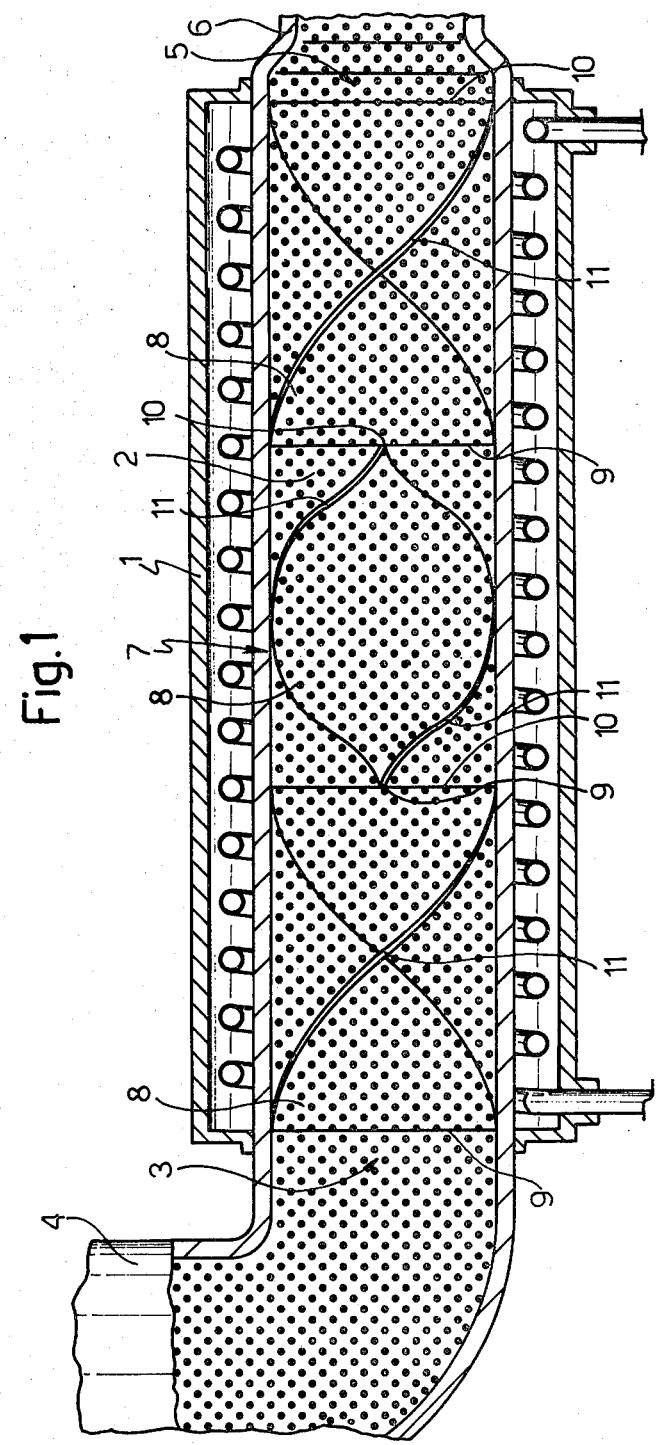
FIG. 1 is a diagrammatic sectional side view of the fundamental portion of a device arranged to perform the process according to the present invention.

Before considering the various stages of the process according to the present invention it is suitable to consider the device shown in the drawings, which allows carrying out the process.

Referring first of all to FIG. 1, the device substantially comprises a container 1, conveniently cylindrical in shape, whose inner cavity 2 is apt to be traversed by a mixture comprising a solid phase and a liquid phase of a metal alloy. Cavity 2 communicates, at a leading end 3 thereof, with a feeding channel 4 arranged to feed the said alloy in a liquid condition into the said cavity; the said alloy may come from a suitable smelting furnace, and arranged between this latter and the feeding channel 4 are disposed means for putting under pressure the said fluid material, which means, of the type operating intermittently or continuously, are formed for example, in the first case, by piston pushing means and, in the second case, by a gear pump.

The container 1 is cooled by suitable cooling means (for example, a serpentine 1a which is traversed by a cooling liquid), in order to gradually cool the material flowing through the cavity 2.

The rear end 5 of the cavity 2 communicates with a nozzle 6 arranged to supply the mixture which has traversed the cavity to a suitable machine which utilizes the mixture, such as for example a pressure die-casting press or a die in which the material may be received.

Disposed within the cavity 2 are flow separation and conveyance means arranged to be traversed by the material passing in a longitudinal direction through the cavity. These means comprise a plurality of fins 8 (clearly shown in FIGS. 2, 3 and 4), each of which has the function of separating the flow of material which is being fed upstream the fin itself into at least two independent streams and making each of them follow such a trajectory as to obtain in each stream originated in the subsequent fin the confluence of portions of the two streams of the immediately preceding fin.

To this end, each fin may conveniently have the configuration shown in FIGS. 2, 3 and 4, i.e. a configuration obtained by helicoidally twisting a lamination in the direction of the axis of the cavity 2. The axial length and the pitch of the helix are chosen in such a way that the end edges, i.e. the leading edge and the rear edge 9 and 10 respectively, of each fin will be rotatable by 90° with respect to one another. It is clear that under these circumstances the flow of the material flowing through the cavity 2 is subdivided by each fin 8 into two substantially equal streams and that each of the streams is rotated by an angle of 90° as it flows through the fin itself.

The various successive fins 8 are as well angularly displaced by 90° relative to each other, as can clearly be seen in the drawings, so that the rear edge 10 of each of these successive fins is substantially orthogonal to the leading edge 9 of the immediately subsequent fin.

The said fins are fastened to the container in any suitable manner, by means of suitable connection means (not shown).

Even if in the embodiment shown the various fins 8 are helicoidally twisted in the same direction, it is possible to dispose alternately fins with left-hand helix and fins with right-hand helix.

It is also obvious that the separation and conveyance means may be different from those described hereinabove and shown in the drawings and be arranged, for example, to divide the flow they receive into more than two streams and to impart to them successive rotations by angles different from 90°.

Therefore, it is obvious that by choosing fins having suitable configurations and dimensions it is possible to realize a trajectory for the flow of mixture having the desired characteristics (cross-section, direction, length). It is also possible to provide means for varying the relative position of each fin with respect to the other fins and with respect to the container, in order to obtain flows having the desired characteristics.

The process according to the present invention, carried out by means of the device described hereinabove, takes place as follows.

A metal alloy, which is rendered liquid by melting, is introduced under pressure into the feeding channel 4; the pressure is chosen in such a way as to overcome the resistances of fluodynamical type which the material encounters as it traverses the separation and conveyance means disposed inside the container 1 and to make it come out at the nozzle 6 with a pre-established speed.

The material which appears at the leading end 3 (FIG. 2) still in completely liquid condition, undergoes, during its passage through the cavity 2, a progressive cooling obtained by the cooling means 1a. The material which enters the first fin 8 is subdivided into two streams 15 and 16 indicated by the white and dashed arrows in Figures from 1 to 4; during the passage through the first fin, each stream is rotated substantially by 90° and consequently, when it is supplied to the second fin it is divided thereby into two further streams (each of which is indicated by white and dashed arrows). Thus, it is obvious that each stream flowing through one of the said two channels, defined by the second fin 8, is actually formed by the material arriving from the two streams 15 and 16 (FIG. 3) which have traversed each of the channels defined by the immediately preceding fin; analogously, when each stream thus formed traverses the third fin (FIGS. 3 and 4) it is further subdivided into two streams (each of which is indicated by two pairs of white and dashed arrows).

Therefore, according to the process of the present invention, when the material traverses each of the fins described hereinabove, it is divided into two independent streams, each of which is obtained by taking material from the streams coming out from the immediately preceding fin.

As the material traverses in a longitudinal direction the cavity 2 it is cooled by the cooling means 1a; it follows that the alloy, as it is being cooled, tends to originate a mixture comprising a solid phase and a liquid phase and in which the solid phase contents tends to grow with the cooling, i.e. as the material advances along cavity 2. The particles of material pertaining to one line of flow which forms each of the streams traversing each fin 8, assume a pre-established speed which obviously depends on the position which the line of flow has relative to the surfaces defining the respective stream (the surfaces of fins 8 and cavity 2); it follows that while the mixture passes through each of the fins, it is subjected to a creep which obviously depends on the distribution of the speeds of the various lines of flow of each stream; this creep can be evaluated by means of the creep gradient defined by the ratio between the speed variation between two lines of flow and their distance. Because of this creep between the various particles, which is the more higher, the more greater the respective gradient, the dendritic bonds which tend to form in the mixture of material as it advances along the fin are broken and the formation of new bonds is prevented.

As soon as the material leaves a fin and is supplied to the next, it is in a completely different range of speeds, owing to the fact that the various particles are located in lines of flow whose position, relative to the surfaces which define the respective stream, is completely different from that in which were the lines of flow which, in the preceding fin, contained the same particles. In fact, if we consider, for example, a line of flow which in the first fin is situated immediately near the surface of the said fin and not in its center, and which accordingly has a considerably low (almost null) speed due to its considerable proximity to the said surface, when this line of flow is introduced into the immediately successive fin, it results in being situated substantially in the center of the stream which is generated in the said fin, i.e. at a greater distance from the surface of the fin; it is obvious that a line of flow in this position will be expected to have a much higher speed than that of the corresponding line of flow of the immediately preceding fin.

Such sudden speed variation to which the various particles are subjected as they pass from one fin to the next, gives rise to a considerable increase of the creep gradient, with the advantage of considerably incrementing the creeps and the impacts between the particles belonging to the various lines of flow and thus breaking, to a considerable extent, the dendritic bonds which tend to form in the solid phase of the material which moves along the cavity 2. Thus, it is obvious that with the process of the present invention considerable creeps are produced between the particles of the various lines of flow in the stream of material which advances along the cavity 2, substantially without producing vorticose movements, and therefore with the possibility to make the flow advance at a very high speed and a very large range. Furthermore, these advantages are obtained with a device which is remarkably simple and has no moving members, this latter condition allowing to render the device considerably reliable in use when it is subjected, as well-known, to high thermal and mechanical stresses.

As the flow of material advances along the cavity 2 it is also subjected to a very high thermal gradient. This is due to the high thermal exchanges which are produced between the particles of the various streams traversing the fins 8; in fact, these exchanges are possible because of the high mixing action which takes place between the various streams during the passage from one fin to the next.

Owing to this thermal gradient it has been noticed that there is a tendency to the formation of many solid particles having small dimensions, i.e. a mixture with a high contents of solid phase, which however has a rather low viscosity.

Moreover, it has to be taken into consideration that owing to the considerable mixing action to which the mixture is subjected between the the inlet section and the outlet section 3 and 5 respectively, there is also a very homogeneous and regular distribution of the particles of the solid and liquid phases in the mixture which comes out from the nozzle 6.

With the process and the device according to the invention it has been possible to obtain a mixture coming out from the nozzle 6 of the device with a remarkably high percentage of solid phase due to the presence of a very large number of small particles, which number is quite larger than that which is usually obtained in the prior art processes, this mixture having however a very high viscosity, as is that which is necessary for for subjecting the mixture to the subsequent stages of molding in a die or by means of the high pressure die-casting technologies. In fact, it has been found that the contents of solid phase in the mixture could be in the order of 60-65%, with a viscosity of the mixture in the order of tens of poises. This advantageous result is certainly dependent on the remarkable creep action and impacts to which the material is subjected during the process. Moreover, also the time necessary for the preparation of a pre-established quantity of mixture having the aforementioned characteristics is considerably shorter than those obtainable with the prior art processes described hereinabove.

An example of accomplishment of the process for the treatment of an alloy Sn-15% Pb will now be described.

This alloy has been poured in a molten condition into a U-shaped pipe and maintained at a temperature of about 250°C. by means of an electric resistance wound along the walls of the pipe; a piston, movable inside the tube, exerted a pressure of 0.3 Kg/cm$^2$ on the molten alloy. The alloy was introduced into a container like that indicated by reference numeral 1 in FIG. 1, in the inner cavity 2 of which there were disposed fins like those indicated by reference numeral 8 in FIG. 2.

Simultaneously, the outer walls of the container were cooled by means of a serpentine and maintained at a temperature of about 120°-140° C.

The semiliquid coming out from the nozzle 6 of the container 1, having a high fraction of solid (about 60-70%), is subsequently subjected to a rapid cooling action in the air, owing to the small cross-section of the extruded product.

The values of the fundamental operative parameters relating to the example described are as follows:

Temperature of the alloy Sn-15% Pb at the inlet of the container:

$T_i = 250°$ C.

Temperature of the semiliquid material at the outlet of the nozzle 6:

$T_u = 190°$ C.

Length of the container 1:

L = 20 cm.

Inner diameter of the container:

D = 1.7 cm.

Specific heat of the alloy Sn-15%Pb:

Cp = 0.05 cal/g.

Density of the Sn-15%Pb alloy:

$\rho = 7.9$ g/cm$^3$.

Average heat conductivity of the Sn-15%Pb alloy:

K = 0.14 cal/cm.s.

Heat conductivity of the walls of the container:

K' = 0.19 cal/cm.s.

Thickness of the walls of the container:

s = 0.5 cm.

Melting heat of the Sn-15%Pb alloy:

$\lambda = 16.3$ cal/g

Volumetric range of the flow:

$p \simeq 5$ cm$^3$/s.

Temperature of the walls of the container:

T = 120°-140° C.

It is clear that the process according to the invention can be carried out also by utilizing a device different from that described hereinabove; in fact, other constructional arrangements can be found, with which it will be possible to accomplish the operations described hereinabove. These operations may be carried out, for example, by arranging a plurality of fins having a different configuration, by which the material entering each of them can be divided in more than two streams, for example four, and by which each stream is made to flow along a trajectory different from the helicoidal trajectory, provided that the material of each stream formed upstream each fin comes from at least two streams of the immediately preceding fin.

We claim:

1. A process for the preparation of a mixture comprising a solid phase and a liquid phase of a metal alloy, in which the concentration of the said solid phase has a pre-established value, characterized in that said process comprises at least a first stage for bringing the said alloy into a completely fluid state, a second stage for creating a constant range flow of the said alloy in said fluid state through a body between an inlet section and an outlet section, a third stage for subdividing in a longitudinal direction the said flow into a plurality of flow sections each of which has a predetermined length and in each of which the flow is subdivided into at least two independent streams, and a fourth stage for making each of the said streams flow along such a trajectory as to obtain in each of the said streams of each flow section a confluence of parts of both streams of the immediately preceding section, said third and fourth stages being contemporaneously obtained by fixed separator and conveyance means, the said alloy being cooled while it moves along the said flow so that the material of the said alloy will be subjected, between the inlet and outlet sections, to a high thermal gradient in order to produce the formation of said solid phase to obtain said mixture, and will be subjected to a different shear rate during the passage from one to the other of the said sections in order to produce the break and to prevent the growth of the dendritic bounds which tend to form in the solid phase.

2. A process according to claim 1, characterized in that said fixed separator and conveyance means are baffles solidly jointed with said body.

3. A process according to claim 2, characterized in that said flow passes through said baffles arranged to divide the said flow, in each of the said flow sections into at least two streams and to impart to each of them a substantially helicoidal trajectory.

4. A process according to claim 2, characterized in that the said body is a hollow tubular member in which the said flow is made to move and in which the said baffles are arranged.

5. A process according to claim 3, characterized in that the said baffles are formed by a plurality of helicoidal fins arranged in the direction of movement of the said flow.

6. A process according to claim 5, characterized in that the length of each said fin in the said direction is at least such as to impart to each of the said streams, between the extreme sections of the respective flow section, a rotation of 90°.

7. A process as claimed in claim 6, characterized in that each said fin is formed by a lamination which is helicoidally twisted in the said direction, the said laminations being angularly displaced relative to each other along the said direction so that the outlet edge of each of them will be substatially orthogonal to the inlet edge of the immediately successive lamination.

8. A process according to claim 2, characterized in that the said baffles comprise fins which are all twisted in the same direction.

9. A process according to claim 2, characterized in that the said baffles comprise fins which are right-hand and left-hand twisted and arranged alternately along the said direction.

10. A process according to claim 1, characterized in that it comprises a stage for outting under pressure the said liquid alloy upstream of the said inlet section, in order to originate the said flow and move it between the said separation and conveyance means.

* * * * *